United States Patent Office 3,343,910
Patented Sept. 26, 1967

3,343,910
WATER-SOLUBLE LITHIUM COMPOUNDS
Maurice Archambault, Quebec, Quebec, and Charles A. Olivier, Ste. Foy, Quebec, Canada, assignors to Ministere des Richesses Naturelles, Quebec, Quebec, Canada
No Drawing. Filed July 25, 1963, Ser. No. 301,230
Claims priority, application Great Britain, July 30, 1962, 29,223/62; Canada, Nov. 24, 1962, 863,073
12 Claims. (Cl. 23—32)

This invention relates to the production of water-soluble lithium compounds from lithium-bearing silicates, for example, decrepitated spodumene.

The usual procedure for producing lithium hydroxide, for example, is to causticize isolated pure lithium carbonate. A conventional commercial process for producing lithium hydroxide is first to extract the lithium values by a sulphuric acid leach of decrepitated spodumene or other lithium-bearing silicate, to neutralize the bisulphate product produced and then get rid of the silicum, calcium, magnesium, aluminum, iron and other impurities. The purified sulphate is precipitated with sodium carbonate to produce solid lithium carbonate which is isolated and then converted to lithium hydroxide by treatment with milk of lime.

The applicants have now found that it is possible to derive lithium hydroxide and other water-soluble lithium compounds more directly from the lithium-bearing silicate. The lithium-containing silicate, e.g. decrepitated spodumene is reacted, in a decomposition step, with aqueous sodium carbonate to produce a mixture of hot water-insoluble lithium carbonate and at least one sodium aluminosilicate and a mother liquor. Canadian Patent 643,-843, Archambault, June 26, 1962 discloses a general procedure along these lines. But, to be useful in a direct procedure for preparing water-soluble lithium salts, the reaction between the lithium aluminosilicate and the aqueous sodium carbonate must be regulated so that the resulting decomposition mixture contains lithium carbonate and at least one sodium aluminosilicate selected from the group consisting of isometric sodic zeolite and anhydrous sodium aluminosilicate of jadeite-like composition, but is substantially free from anisometric sodic zeolite, sodic cancrinite, and newly formed complex lithium aluminosilicate.

Preferred conditions to assure formation of at least one of the sodium aluminosilicates selected from the group consisting of isometric sodic zeolite and an anhydrous sodium alumino silicate having the chemical composition of jadeite, and to avoid at the same time the formation of anisometric sodic zeolite, sodic cancrinite and any complex lithium aluminosilicate include the use of an amount of normal sodium carbonate from about 3.5 to about 6 times preferably from about 3.5 to about 4 times the weight of the lithium oxide present, a temperature in the range from about 150° to about 250° C., water in amounts from about 1.0 to about 2.3 times the weight of the lithium-bearing charge, and a time of reaction from about 10 to about 60 minutes.

When the jadeite-like by-product is desired, the beta spodumene or the calcined lithium-bearing silicate is contacted with sodium carbonate in an amount ranging from about 3.5 to about 6 times preferably from about 3.5 to about 4 times the weight of the lithium oxide present (i.e. approximately one to two moles of $Na_2CO_3$ per mole of $Li_2O$), in the presence of water in an amount from about 1 to about 1.6 times the weight of the lithium-bearing material, at a temperature from about 150° C. to about 180° C., for from about 35 to about 50 minutes.

When isometric sodic zeolite is the by-product sought, the beta spodumene is contacted with sodium carbonate in an amount from about 3.5 to about 6 times preferably from about 3.5 to about 4 times the weight of the lithium oxide present, in the presence of water in an amount from about 1.3 to about 2.3 times the weight of the lithium-bearing material, at a temperature from about 185° C. to about 250° C., for from about 10 minutes to about 60 minutes.

The conditions described avoid the formation of anisometric sodic zeolite, sodic cancrinite and any complex lithium aluminosilicate. The presence of such by-products prevents satisfactory conversion of the lithium carbonate in the intermediate mixture to water-soluble lithium compounds. If these undesirable by-products are present the lithium extraction will be low or hard to come by or would require too much purification, to make the process practical.

Once suitable decomposition products are obtained in this way, the hot mother liquor is removed preferably at or near its boiling point and the solids may even be washed with boiling water in order to remove and recycle the unspent sodium carbonate; the remaining solids (called "the intermediate mixture") containing almost exclusively lithium carbonate and a sodium aluminosilicate are reacted in a secondary reaction step directly with a selected reactant to form the desired soluble lithium compounds, without decomposing the sodium aluminosilicate. For example, the applicants may employ water containing as the selected reactant alkaline earth compounds which are more soluble than the corresponding carbonate, or weak acids strong enough to decompose the lithium carbonate without decomposing the sodium aluminosilicate. Thus, a mixture is formed consisting of a lithium compound the composition of which depends on that of the reactant and at least one sodium aluminosilicate, the one present in the intermediate mixture. Where a weak acid is used carbon dioxide gas evolves.

The temperature in the secondary reaction step is desirably between about 0° C. and 85° C. and preferably between about 20° C. and about 60° C. An at least stoichiometric amount (to react with the lithium present) of the reactant is employed. The amount of water will depend on the nature of the compound produced, but enough water must be present to create a slurry with the lithium carbonate and sodium aluminosilicate intermediate mixture, said mixture being preferably washed substantially free from unspent sodium carbonate. The time required for the reaction will generally range from substantially instantaneous to about two hours.

The reactants which one may use are:
(1) The hydroxides of calcium, barium or strontium;
(2) water-soluble alkaline earth metal salts, used with or without carbon dioxide: these salts being the chlorides, the sulphates, the nitrates, the chromates, the acetates and other salts of same metals, but of other acids, whose solubility in water is greater than that of the corresponding carbonates formed during the leaching of the lithium carbonate mixture; (3) weak acids selected from the group consisting of acetic, benzoic, citric, formic, lactic, oxalic, salicyclic, succinic and tartaric acids and other acidic compounds whose dissociation constants at 25° C. range from about $1 \times 10^{-3}$ to $5 \times 10^{-7}$ and whose corresponding lithium salts are at least as soluble as lithium carbonate.

In describing the invention in more detail, the applicants will refer to the accompanying examples, which are based on preferred procedures.

EXAMPLES

Examples 1 to 31, given in tabular form in Tables 1 to 4, show the results of treating the decomposition mixture resulting from a primary reaction of calcined spodumene and aqueous sodium carbonate, according to the conditions described earlier. A specific procedure along these lines is given in Example A by way of further illustrating the procedures of Examples 1 to 31.

*Example A*

Many tests were run in which calcined spodumene concentrate analysing 4.5% $Li_2O$ was contacted in a pressure vessel with sodium carbonate in excess of 10% over the stoichiometrical amount required, in presence of water in an amount representing 1.6 times the weight of the spodumene concentrate. The slurry was then heated and agitated for 1 hour at 200° C. then cooled and contacted at room temperature with 2.5 times the weight of the silicate of a cold aqueous lithium carbonate solution from a previous precipitation; carbon dioxide was bubbled through the slurry for approximately one hour. Then it was filtered and the clear filtrate was heated to about 95° C. to recover $CO_2$ and precipitate $Li_2CO_3$. Lithium recoveries run between 92 and 94%.

The solid residue in all tests has shown to be essentially an isometric sodic zeolite.

The analysis of a typical sample of lithium carbonate as obtained without washing or purifying gave:

| | Percent |
|---|---|
| $Li_2CO_3$ | 99.85 |
| $Na_2CO_3$ | 0.12 |
| $SiO_2$ | 0.03 |
| $R_2O_3$ | 0.00 |

In the case of all the Examples 1 and following, the solution containing the unspent sodium carbonate was first removed from the hot decomposition mixture of solids. Then, instead of leaching said dewatered solids with aqueous carbon dioxide alone, said solids were reacted with the aqueous reactants mentioned in the following tables, so as to give the corresponding lithium compounds in solution form.

TABLE 1.—CAUSTICIZING $Li_2CO_3$ IN PRESENCE OF Na-ALUMINOSILICATES

| Example No. | $Ca(OH)_2$ excess, percent | Temp., ° C. | Time, minutes | LiOH conc., g./l. | Li recovered, percent |
|---|---|---|---|---|---|
| 1 | 8.2 | 30 | 60 | 18.3 | 90–92 |
| 2 | 8.2 | 30 | 90 | 18.6 | 91–93 |
| 3 | 9.5 | 35 | 60 | 20.8 | 93–95 |
| 4 | 9.5 | 35 | 90 | 21.2 | 93–95 |
| 5 | 8.2 | 40 | 60 | 21.2 | 91–93 |
| 6 | 8.2 | 40 | 90 | 21.4 | 93–95 |
| 7 | 9.5 | 47 | 60 | 18.8 | 92–94 |
| 8 | 8.2 | 55 | 60 | 16.2 | 87–89 |
| 9 | 8.2 | 85 | 5 | 10.7 | 77–79 |
| 10 | 8.2 | 85 | 90 | 10.5 | 77–79 |

In the procedure of Examples 1 to 10 the results of which are shown in Table 1, twice as much by weight of water as solids to be leached and calcium hydroxide in the proportions shown in the table were added to the sodium carbonate-free decomposition mixture. The resulting mixture was heated to the temperatures indicated and for the times shown. The concentration of lithium hydroxide in the resulting solution is given in grams per liter. The recovery mentioned in the table is the overall recovery based on the lithium content of the starting spodumene. The leaching was done concurrently in all cases. But, some of the examples were duplicated with the causticizing done countercurrently. The results were even better in terms of both yield and concentration of lithium hydroxide in grams per liter.

The applicants have found that the causticizing agent should not be used in amounts exceeding about 5 to 10% over the stoichiometric quantity required. Too large an excess not only wastes calcium hydroxide but decreases the lithium carbonate conversion to lithium hydroxide. Water should be present in amounts varying according to the weight of the lithium carbonate and of the accompanying alumino-silicates present. Although calcium hydroxide is preferred especially because of its low cost, one can use either barium hydroxide or strontium hydroxide.

When causticizing an isolated alkaline metal carbonate (e.g., pure lithium carbonate or sodium carbonate, etc.), the preferred temperature used in industrial practice for the treatment is generally around 85° C. In contradistinction, the applicants have found preferable to causticize at or near ambient temperature when dealing with their mixture of lithium carbonate and sodium aluminosilicates. They have discovered for instance that if causticizing is done at 85° C. overall results would be very poor and that the treatment would tend to become uneconomical.

TABLE 2.—PRODUCTION OF SOLUBLE LITHIUM SALTS WITH ALKALINE-EARTH METAL SALTS

| Example No. | Salt used | Temp., ° C. | $Li_2O$ conc., g./l. | Lithium recovered, percent |
|---|---|---|---|---|
| 11 | $MgCl_2$ | 30 | 8.7 | 92 |
| 12 | $Ba(NO_3)_2$ | 60 | 10.4 | 92 |
| 13 | $MgCrO$ | 30 | 9.2 | 93 |
| 14 | $CaCrO_4$ | 30 | 8.8 | 93 |
| 15 | $MgSO_4$ | 30 | 6.0 | 89 |
| 16 | $Ca(C_2H_3O_2)_2$ | 30 | 11.4 | 89 |

For Examples 11 to 16, shown in Table 2, the same sodium carbonate-free mixtures as in Examples 1 to 10 was treated. About twice the amount of water by weight, and preferably an almost stoichiometric amount based on the lithium content of the solids to be leached of the respective salts, were added. The resulting mixture was treated at the temperature shown in the table for a time of about 40 minutes. The concentrations of the resulting lithium salts solution are shown expressed in terms of lithium oxide in grams per liter. The overall recovery based on the lithium content of the starting spodumene is shown and expressed in percentage. The leaching was done concurrently in all these examples.

TABLE 3.—SYNERGISTIC EFFECT OF $CO_2$ WHEN USED WITH ALKALINE EARTH METAL SALTS

| Ex. No. | Reactants | Excess of reactant, percent | Addition of $CO_2$ | $Li_2O$ conc., g./l. | Lithium recovered, percent |
|---|---|---|---|---|---|
| 17 | $CaCl_2$ | 15 | No | 5 | 43 |
| 18 | $CaCl_2$ | 0 | Yes | 14 | 95 |
| 19 [1] | $CaCl_2$ | 0 | No | 12 | 80 |
| 20 | $SrCl_2$ | 13 | Yes | | 90 |
| 21 | $Sr(NO_3)_2$ | 25 | No | | 52 |
| 22 | $Sr(NO_3)_2$ | 25 | Yes | | 94 |

[1] In all cases, the treatment was conducted concurrently except for Example 19 where it was countercurrently.

For Examples 17 to 22 shown in Table 3, the material treated and the treatment effected were substantially the same as for Examples 11 to 16. The amount of reactant however varied, as shown in the table. Leaching was effected in all cases concurrently except for Example 19 which was countercurrently. Examples 18, 20 and 22 show the beneficial influence of an addition of carbon dioxide on both lithium recovery and concentration of solution. Carbon dioxide in those examples was added in an amount sufficient to convert the lithium carbonate to bicarbonate. It seems evident that carbon dioxide enhances considerably the conversion of lithium carbonate to the lithium salt desired. In the presence of specified sodium aluminosilicates, the action of carbon dioxide is truly synergistic.

Examples 23 to 31 shown in Table 4 follow the pattern of Examples 11 to 16, weak acids being used as the reactants. The respective results are shown in Table 4.

TABLE 4.—PRODUCTION OF SOLUBLE LITHIUM SALTS WITH WEAK ACIDS

| Example No. | Acid Used | Li₂O concentration, g./l. | Lithium recovered, percent |
|---|---|---|---|
| 23 | Lactic | 9.0 | 91 |
| 24 | Acetic | 12.0 | 93 |
| 25 | Salicyclic | 10.5 | 93 |
| 26 | Oxalic | 11.6 | 92 |
| 27 | Tartaric | 11.6 | 93 |
| 28 | Formic | 12.1 | 90 |
| 29 | Benzoic | 11.0 | 90 |
| 30 | Succinic | 11.8 | 90 |
| 31 | Citric | 8.4 | 90 |

The recovery is calculated on the basis of the starting spodumene.

Acids for leaching the lithium carbonate from the accompanying silicates should be used in amounts not exceeding about 2 to 5% of the stoichiometric amount required, acids and water being present in global amounts varying according to the weight of the lithium carbonate and of the aluminosilicates present and ranging generally from about 1 to about 2.5 times the weight of the solids to be leached.

Thus, the desired water-soluble lithium compound may be obtained in a process which leads directly from the ore or concentrate to the end product, without isolating the products of the primary decomposition as in the prior art and without any special purification steps. Why this can be done is because of the special conditions in the decomposition step, which favour formation of certain aluminosilicates to the elimination of others. This provides an intermediate product different from any lithium-silicate decomposition product of prior processes. The intermediate is a mixture of lithium carbonate, isometric sodic zeolite (Na₂O.Al₂O₃.4SiO₂.xH₂O) and/or a compound jadeite-like in chemical composition (Na₂O.Al₂O₃.4SiO₂)

and is free from anisometric sodic zeolite (Na₂O.Al₂O₃.2SiO₂.yH₂O)

sodic cancrinite, and newly formed complex lithium aluminosilicates which might be derived from the decomposing step (as opposed to being present to start with in the lithium-bearing ore or concentrate). The intermediate has the unexpected property that it can be reacted directly with the reactants described earlier to form water-soluble lithium salts in substantially pure form. The content of the intermediate other than the lithium carbonate does not interfere with the reaction and the aluminosilicate fraction can be readily removed from the reaction product.

These intermediate products resulting from the decomposing step are new and useful products of themselves. They lend themselves to being acted on with other chemicals so as to form lithium salts other than the carbonates. Generally, it is most economical not to isolate the intermediate but to act on it directly. However, there can be circumstances under which it would be desirable to recover the intermediate as such and/or to modify it or shape it for further treatment later on. Thus, the intermediate itself is a new article of commerce.

The "intermediate" may also be used in the ceramic industry as a flux or as a glazing material due to its low sintering and melting points and harness of the fused product.

RECOVERY OF LITHIUM COMPOUNDS FROM BY-PRODUCTS

The leaching reaction products are made out of a solution of the newly formed lithium compound, plus solid sodium aluminosilicate and, where alkaline earth compounds were used as reactants, alkaline earth carbonates (i.e. MgCO₃, CaCO₃, BaCO₃ or SrCO₃). These various products may be separated one from the other in the following manner:

The lithium compound, which is in solution form, is separated from the accompanying solids by decantation, filtration and/or centrifugation. The clear solution thus obtained is concentrated by heat and/or vacuum to the point of crystallization whereby the lithium-bearing crystalline compound is sorted out from the mother liquor which is returned to the process. The lithium-bearing crystals being formed in a medium where interfering elements are effectively absent are commercially pure.

The alkaline earth metal carbonates (i.e. CaCO₃ MgCO₃, BaCO₃ or SrCO₃) that were produced during the causticizing or the solubilizing of the lithium carbonate are or may be separated from the sodium aluminosilicate by conventional mineral dressing methods such as flotation, levitation, etc.

When carbon dioxide has been used to reinforce in a synergistic manner the action of alkaline earth metal salts it is or may be recovered for reuse in the leaching process by evolving the carbon dioxide contained in the CO₂-bearing solution by heating and agitating.

Where weak acids are used as leaching reactants, carbon dioxide resulting from the decomposition of lithium carbonate is also evolved and recuperated as mentioned above.

The sodium aluminosilicates either the anhydrous type or the hydrated type previously described are or may be recovered as by-products.

These various recovery operations are accomplished in conventional vessels by methods known for other purposes and so the technology of the whole process does not require to be described in detail.

The process of the invention lends itself well into cyclic procedure.

The starting mineral has been stated as a calcined lithium-bearing silicate. A preferred silicate is beta spodumene. However, other silicates selected from the group consisting of petalite, eucryptite and lepidolite, previously calcined to above about 680° C., 980° C. and 850° C. respectively, may be employed.

We claim:
1. A process for producing water soluble lithium compounds from a calcined lithium-bearing silicate, which comprises: (a) reacting said silicate with an aqueous sodium carbonate in an amount and under hydrothermal conditions effective to form an aqueous slurry containing a mixture of water-insoluble lithium carbonate and at least one sodium aluminosilicate selected from the group consisting of isometric sodium zeolite

(Na₂O.Al₂O₃.4SiO₂.xH₂O)

and a compound jadeite-like in chemical composition (Na₂O.Al₂O₃.4SiO₂)

and unspent sodium carbonate and to prevent the production of anisometric sodium zeolite (Na₂O.Al₂O₃.2SiO₂.yH₂O)

sodic cancrinite or complex lithium aluminosilicates: (b) separating the unspent sodium carbonate from said hot aqueous mixture of solids; (c) selectively dissolving the lithium values from said separated mixture of solids with water and at least one dissolving agent selected from the group consisting of alkaline earth metal compounds in aqueous medium, and aqueous solutions of acids other than carbonic acid whose dissociation constants at 25° C. range from about 1×10⁻³ to 5×10⁻⁷ at a temperature from ambient to about 60° C. to form a lithium-bearing solution and a sodium aluminosilicate-bearing solid residue; and (d) recovering from said solution a crystalline lithium compound.

2. A process, as defined in claim 1, wherein the dissolving agent is selected from the group consisting of alkaline earth metal chlorides, sulphates, nitrates, chromates, acetates, calcium, barium and strontium hydroxides, whose solubilities in water are greater than those of the corresponding carbonates formed by the selective dissolving of the lithium values.

3. A process, as defined in claim 1, wherein the dissolving agent is an aqueous dispersion of an alkaline earth metal salt selected from the group consisting of the chlorides, the sulphates, the nitrates, the chromates, and the acetates whose solubilities in water are greater than those of the corresponding carbonates formed by the selective dissolving of the lithium values and carbon dioxide is added to the aqueous dispersion.

4. A process, as defined in claim 1, wherein the dissolving agent is a weak acid selected from the group consisting of acetic, benzoic, citric, formic, lactic, oxalic, salicylic, succinic and tartaric acids, whose corresponding lithium salts are at least as soluble as the lithium carbonate.

5. A process, as defined in steps (a) and (b) of claim 1, wherein the dewatered mixture of solids containing lithium carbonate and specified aluminosilicates but free from anisometric sodium zeolite, sodic cancrinite and complex lithium aluminosilicate is selectively dissolved at from ambient temperature to less than about 60° C., with water containing a dissolving agent selected from the group consisting of calcium hydroxide, strontium hydroxide and barium hydroxide, said hydroxide being used in amount from at least the stoichiometric amount to 10% over the stoichiometric amount required, water being present in amounts ranging from about 1 to about 3 times the weight of the solids to be leached.

6. A process, as defined in steps (a) and (b) of claim 1, wherein the dewatered mixture of solids containing the lithium carbonate and the specified sodium aluminosilicates is selectively dissolved at from ambient temperature to less than about 60° C. with water containing a dissolving reactant selected from the group of chemicals consisting of those acids whose dissociation constants at 25° C. range from about $1 \times 10^{-3}$ to $5 \times 10^{-7}$ said acids being used in amounts from at least the stoichiometric to 5% over the stoichiometric amount required, the acids and water being present in amounts ranging from about 1 to about 2.5 times the weight of the solids to be leached.

7. A process for producing water-soluble crystalline lithium compounds, comprising: selectively dissolving a hot water-insoluble lithium carbonate-bearing mixture substantially free from anisometric sodium zeolite, sodic cancrinite and complex lithium aluminosilicates, and containing at least one sodium aluminosilicate selected from the group consisting of isometric sodium zeolite and a compound of jadeite-like chemical composition, said selective dissolving being effected with at least one dissolving reactant selected from the group consisting of alkaline earth metal compounds in aqueous medium and aqueous solutions of acids whose dissociation constants at 25° C. range from about $1 \times 10^{-3}$ to $5 \times 10^{-7}$ at a temperature from ambient to about 60° C. to form a lithium compound-bearing solution and a sodium aluminosilicate-bearing solid residue, and recovering from said solution the lithium compound.

8. A process for producing water-soluble crystalline lithium compounds, comprising, selectively dissolving a mixture containing hot water-insoluble lithium carbonate and at least one sodium aluminosilicate selected from the group consisting of isometric sodium zeolite and a compound jadeite-like in chemical composition and substantially free from anisometric sodium zeolite sodic cancrinite and complex lithium aluminosilicates, said dissolving being effected with at least one dissolving reactant selected from the group consisting of alkaline earth metal compounds in aqueous medium and aqueous solutions of acids whose dissociation constants at 25° C. range from about $1 \times 10^{-3}$ to $5 \times 10^{-7}$ at a temperature from ambient to about 60° C. to form a lithium compound-bearing solution and a sodium aluminosilicate-bearing solid residue, and recovering from said solution the lithium compound.

9. A process for producing water-soluble crystalline lithium compounds from a mixture containing hot water-insoluble lithium carbonate and at least one sodium aluminosilicate selected from the group consisting of isometric sodium zeolite and a compound jadeite-like in chemical composition and substantially free from anisometric sodium zeolite sodic cancrinite and complex lithium aluminosilicates formed by decomposing a calcined lithium-bearing silicate with aqueous sodium carbonate, comprising: (a) selectively dissolving said lithium-bearing mixture with a dissolving reactant selected from the group consisting of alkaline earth metal compounds in aqueous medium and aqueous solutions of acids whose dissociation constants at 25° C. range from about $1 \times 10^{-3}$ to $5 \times 10^{-7}$ at a temperature from ambient to about 60° C. to form a lithium compound-bearing solution and a sodium aluminosilicate-bearing solid residue, and (b) recovering from said solution the lithium compound.

10. A process for producing water-soluble crystalline lithium compounds, comprising: (a) separating a solution of sodium carbonate from a hot aqueous mixture containing solid lithium carbonate, and at least one sodium aluminosilicate selected from the group consisting of isometric sodium zeolite and a compound jadeite-like in chemical composition and substantially free from anisometric sodium zeolite sodic cancrinite and complex lithium aluminosilicates, formed by decomposing a calcined lithium-bearing silicate with an aqueous sodium carbonate solution: (b) selectively dissolving the lithium values from said separated mixture of solids with a dissolving agent selected from the group consisting of alkaline earth metal compounds in aqueous medium and aqueous solutions of acids whose dissociation constants at 25° C. range from about $1 \times 10^{-3}$ to $5 \times 10^{-7}$ at a temperature from ambient to 60° C. to form a lithium compound-bearing solution and a sodium aluminosilicate-bearing solid residue; and (c) recovering from said solution a lithium compound.

11. A process for producing water-soluble lithium compounds from calcined lithium-bearing silicate, which comprises the steps of: (a) decomposing said silicate at a temperature in the range from about 150° C. to about 250° C. in a pressure vessel with sodium carbonate in an amount from about 3.5 to about 6 times the weight of the lithium oxide present, in the presence of water in an amount preferably from about 1 to about 2.3 times the weight of the lithium-bearing charge and for from about 10 to about 60 minutes, forming thereby an aqueous mixture containing solid lithium carbonate unspent sodium carbonate and at least one sodium aluminosilicate selected from the group consisting of isometric sodic zeolite and sodic compound jadeite-like in chemical composition and substantially free from an isometric sodic zeolite, sodic cancrinite and complex lithium aluminosilicates, (b) separating the unspent sodium carbonate from said hot aqueous mixture of solids; (c) selectively dissolving the lithium values from said separated mixture of solids with a dissolving reactant selected from the group consisting of alkaline earth metal compounds in aqueous medium and aqueous solutions of acids whose dissociation constants at 25° C. range from about $1 \times 10^{-3}$ to $5 \times 10^{-7}$ at a temperature from ambient to 60° C. to form a lithium compound-bearing solution and a sodium aluminosilicate-bearing solid residue; and (d) recovering from said solution the lithium compound.

12. A process, as defined in claim 11, in which the amount of sodium carbonate used is from about 3.5 to about 6 times the weight of the lithium oxide present in the calcined lithium-bearing silicate.

(References on following page)

References Cited

UNITED STATES PATENTS

| | | | |
|---|---|---|---|
| 2,413,644 | 12/1946 | Nicholson | 23—184 X |
| 2,627,452 | 2/1953 | Cunningham | 23—89 |
| 2,662,809 | 12/1953 | Kroll | 23—89 X |
| 2,793,933 | 5/1957 | Kroll | 23—89 X |
| 2,940,820 | 6/1960 | Mazza et al. | 23—184 X |
| 3,073,673 | 1/1963 | Chubb | 23—63 |
| 3,112,171 | 11/1963 | Archambault | 23—112 X |
| 3,193,352 | 7/1965 | McDonough et al. | 23—184 |

OTHER REFERENCES

Ind. & Eng. Chem., vol. 43, No. 13, page 2642.

J. W. Mellor: "A Comprehensive Treatise on Inorganic and Theoretical Chemistry," vol. 4, 1923 ed., page 351, Longmans, Green & Co., New York.

OSCAR R. VERTIZ, *Primary Examiner.*

EDWARD STERN, *Examiner.*